United States Patent
Brezak et al.

(10) Patent No.: US 7,210,167 B2
(45) Date of Patent: Apr. 24, 2007

(54) CREDENTIAL MANAGEMENT

(75) Inventors: John E. Brezak, Woodinville, WA (US); Clifford P. Van Dyke, Bellevue, WA (US); John M. Hawkins, Duvall, WA (US); Klaus U. Schutz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 716 days.

(21) Appl. No.: 09/757,058

(22) Filed: Jan. 8, 2001

(65) Prior Publication Data

US 2003/0065940 A1    Apr. 3, 2003

(51) Int. Cl.
*G06F 3/00* (2006.01)
(52) U.S. Cl. .................... 726/18; 726/5; 726/6
(58) Field of Classification Search ............ 713/201, 713/202; 709/227; 726/8, 2, 4, 19, 18
See application file for complete search history.

(56) References Cited

U.S. PATENT DOCUMENTS 6,289,462 B1 * 9/2001 McNabb et al. ............ 713/201
6,460,141 B1 * 10/2002 Olden ........................ 713/201
6,615,264 B1 * 9/2003 Stoltz et al. ................ 709/227
6,934,848 B1 * 8/2005 King et al. ................. 713/182

* cited by examiner

*Primary Examiner*—Gilberto Barron, Jr.
*Assistant Examiner*—Ellen C. Tran
(74) *Attorney, Agent, or Firm*—Lee & Hayes, PLLC

(57) ABSTRACT

Described herein is an implementation of a technology for managing credentials. With an implementation, a credential manager is domain-authentication aware and concurrent authentications with multiple independent networks (e.g., domains) may be established and maintained. Moreover, a credential manager provides a credential model retrofit for legacy applications that only understand the password model. The manager provides a mechanism where the application is only a "blind courier" of credentials between the trusted part of the OS to the network and/or network resource. The manager fully insulates the application from "read" access to the credentials. This abstract itself is not intended to limit the scope of this patent. The scope of the present invention is pointed out in the appending claims.

32 Claims, 5 Drawing Sheets

CREDENTIAL MANAGEMENT

TECHNICAL FIELD

This invention generally relates to a technology for managing credentials.

BACKGROUND

A typical credential manager is program module on a computer, such as a personal computer (PC). More particularly, a credential manager is typically part of the trusted core of an operating system (OS) of a PC. As the name implies, a credential manager handles the access to (e.g., reads and writes) and storage of credentials, which are used to gain access to networks (e.g., domains) and network resources.

No conventional credential manager provides a mechanism to retrofit legacy system—that only have provisions for traditional username/password authorization model—to use a non-password authorization model (e.g., X.509 Certificates).

Some conventional credential managers provide a mechanism binding a minimum set of credentials to resources requiring authentication. The goal of these conventional managers is to provide a "single sign-on" that gives access to a variety of resources across one or more networks and access to one or more networks. However, none of these conventional credential managers employs a single sign-on mechanism that automatically and transparently provides credentials for accessing the multiple resources within an authorized domain to the multiple resources.

Credentials

A "credential" is a generic term for data used to verify the identity of an entity. An entity may be a server, a client, a service, etc. Typically, it is a user. Common forms of credentials include username/password model, X.509 Certificates, and bio-metric identification. There are two general types of credentials: Domain credentials and generic credentials.

Domain Credentials. Typically, these are used by operating system (OS) components and authenticated by a local security authority (LSA). LSA is a typically a low-level program module (e.g., part of the trusted core of the OS) that ensures that the entity attempting to access the system actually has permission to access the system.

Typically, domain credentials are established for a user when a registered security support provider (SSP), such as Kerberos, authenticates logon data provided by the user. The logon credentials are cached by the OS so that a single sign-on gives the user access to a variety of resources. For example, network logons can occur transparently, and access to protected system objects can be granted based on a user's cached domain credentials.

Domain credentials are protected by the operating system; only components running in-process with the LSA can read and write domain credentials. Applications are typically limited to writing domain credentials.

Generic Credentials. These are defined and authenticated by applications that manage authorization and security directly, instead of delegating these tasks to the operating system. For example, an application can require users to enter a user name and password provided by the application or to produce a certificate in order to access a Web site.

Applications may prompt users for application-defined (generic) credential information such as username, certificate, smart card, or password. The information entered by the user is returned to the application. Authenticating this information is the responsibility of the application—not the OS.

Unlike domain credentials, generic credentials may be read and written by user processes (e.g., applications).

One way of implementing generic credentials is via "cookies." A cookie is a message given to a Web browser by a Web server. The browser typically stores the message in a text file. The message is then sent back to the server each time the browser requests a page from the server.

One of the main purposes of cookies is to identify and authorize users. When a user initially enters a Web site, the user may be asked to fill out a form providing identification information. This information is packaged into a cookie and sent to the Web browser, which stores it for later use. The next time the user goes to the same Web site, the browser will send the cookie to the Web server. The server can use this information to identify and authenticate the user.

In this example, the application program controls the credentials—the application program can both read and write the credentials. Thus, these credentials are generic.

Identification and Authentication Models

Existing software authentication systems typically are based on a username and password pair model ("password model"). In this model, the username identifies a user and the password verifies such identity. The use of this model is extensive and there is substantial software written to use this form of credential.

However, there are non-password based user credentials, such as X.509 Certificates or bio-metric identification/authentication models. In order to upgrade software systems to use non-password based user credentials, major rewrites are required if conventional techniques are used.

Single Sign-On

Traditional methods of providing single sign-on usually require that a distinct credential be used for each unique application or resource that requires authentication. This can result in the storage of large numbers of user credentials that must be securely maintained for the user and managed.

Conventional Credential Managers

No conventional credential manager is domain-authentication aware. In other words, no conventional manager provides a mechanism where authentication by one resource in a trust network enables automatic (without manual user input) authenticated access to all resources in that trust network.

No conventional credential manager provides a mechanism for concurrent authentications with multiple independent networks (e.g., domains).

No conventional credential manager has an encrypted database structure of user's credentials, where the entire structure is encrypted (as opposed to encrypting each credential separately).

No conventional credential manager provides a credential model retrofit for legacy applications that only understand the password model. No conventional manager marshals high-level credentials (such as a certificate) so that the high-level credential appears to be a low-level credential (such as a user/password) to legacy applications.

No conventional credential manager provides a mechanism where the application is only a "blind courier" of credentials between the trusted part of the OS to the network and/or network resource. No conventional manager fully insulates the application from "read" access to the credentials.

SUMMARY

Described herein is a technology for managing credentials. With an implementation of this technology, described herein, a credential manager is domain-authentication aware. In other words, an authentication by one resource in a trust network enables automatic (without manual user input) authenticated access to all resources in that trust network.

With an implementation of this technology, concurrent authentications with multiple independent networks (e.g., domains) may be established and maintained.

With an implementation of this technology, a credential manager provides a credential model retrofit for legacy applications that only understand the password model. The manager marshals high-level credentials (such as a certificate) so that the high-level credential appears to be a low-level credential (such as a user/password) to legacy applications.

With an implementation of this technology, a credential manager provides a mechanism where the application is only a "blind courier" of credentials between the trusted part of the OS to the network and/or network resource. The manager fully insulates the application from "read" access to the credentials.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

The following description sets forth specific embodiments of a credential management that incorporate elements recited in the appended claims. These embodiments are described with specificity in order to meet statutory written description, enablement, and best-mode requirements. However, the description itself is not intended to limit the scope of this patent.

Described herein are one or more exemplary implementations of credential management. The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of a credential management may be referred to as an "exemplary cred-manager."

Introduction

Figure 5:
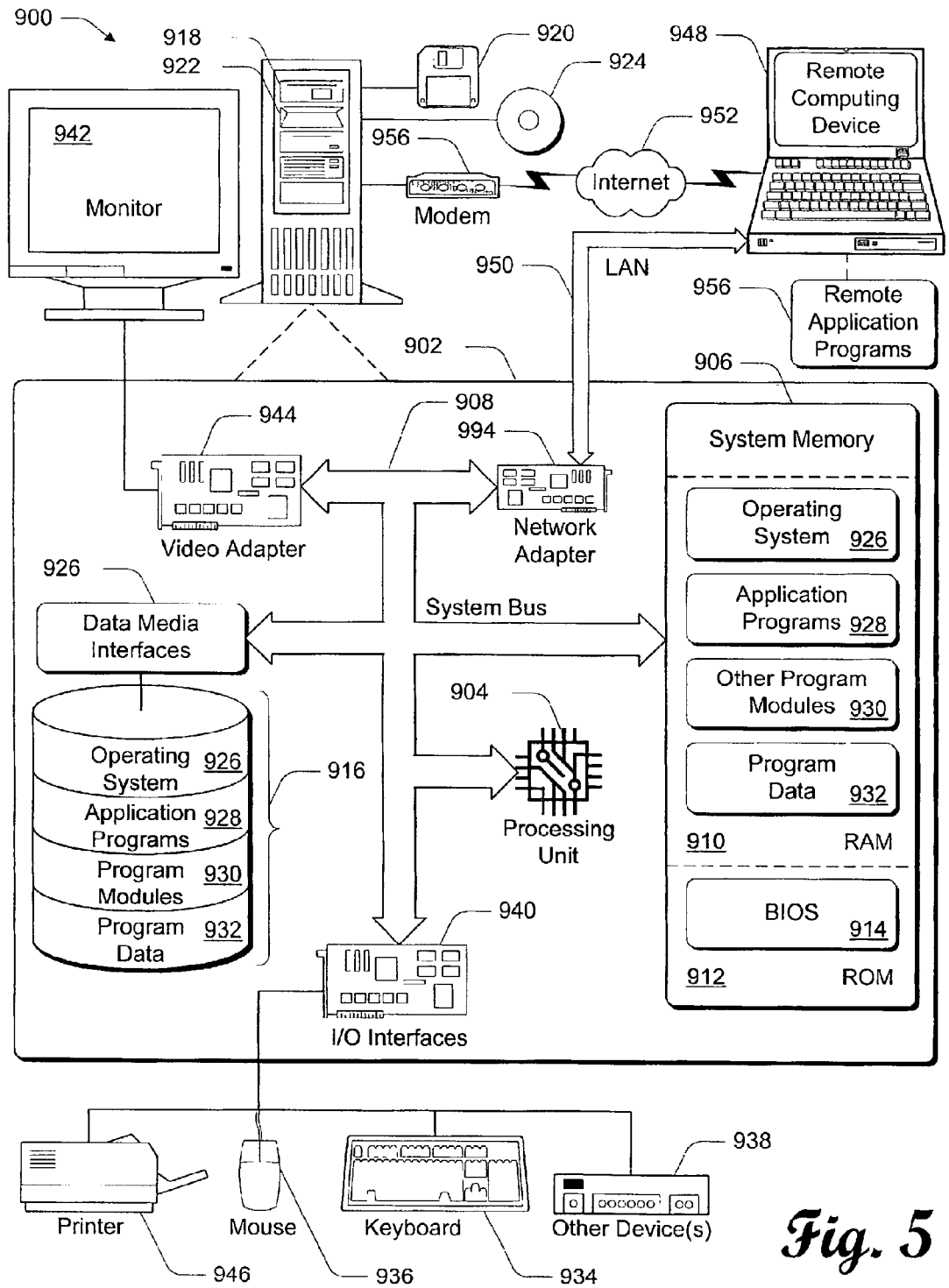
FIG. 5 is an example of a computing operating environment capable of implementing an implementation (wholly or partially) of the invention claimed herein.

The one or more exemplary implementations, described herein, of the present claimed invention may be implemented (whole or in part) within a credential management architecture 100 and/or by a computing environment like that shown in FIG. 5.

The "domain credentials" are the focus of the exemplary implementations, described herein, of the present claimed invention. Unless otherwise specified or apparent from the context, references to "credentials" within the description of the exemplary implementations are specifically to "domain credentials."

Exemplary Cred-Manager

Figure 1:
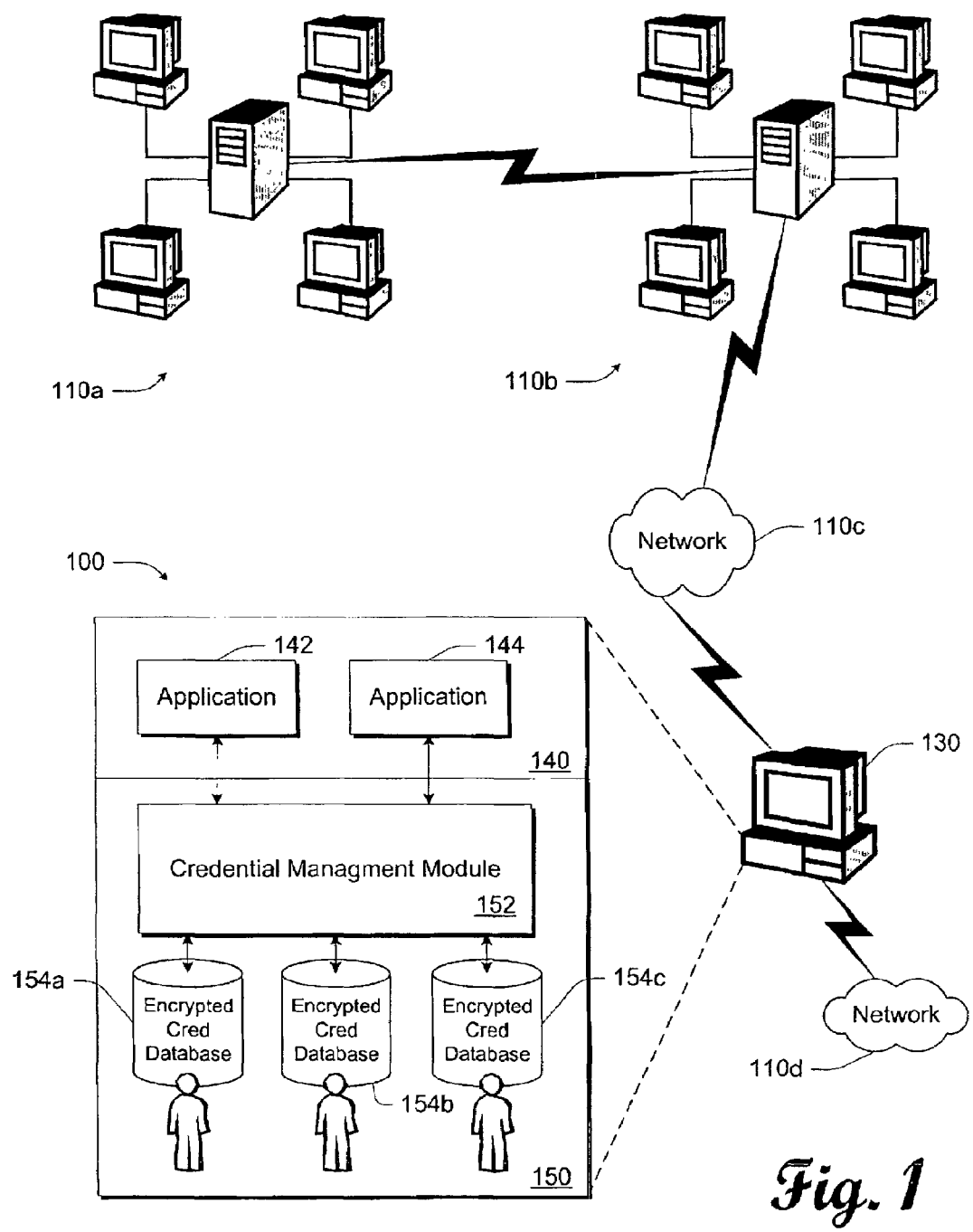
FIG. 1 is a schematic block diagram showing a networking environment in which an embodiment of the invention claimed herein may be implemented and an architecture in accordance with an implementation of the invention claimed herein.

FIG. 1 shows a networking environment and the credential management architecture 100. Specifically, FIG. 1 illustrates a computer 130, like one shown in FIG. 5. Within the computer 130 is the credential management architecture 100. Operatively coupled to the computer 130 are one or more networks, such as networks 110a, 110b, and 110c. The computer 130 may be connected to any one of these networks, but for illustrative purposes, it is connected to network 110c, which is connected to network 110b, which is connected to network 110a.

These networks 110a–c may be considered domains having sharable network resources. These networks may be local area networks (LANs) or wide area networks (WANs). The networks may host network applications such as Web site(s), e-mail, databases, file servers, data centers, FTP servers, etc. In general, each domain authenticates user access via a domain credential. Such credential provides access to domain resources and applications. Of course, particular resources and applications may have their own credential that differs from the common credential for the entire domain.

The credential management architecture 100 includes the application layer 140 and the secured operating system (OS) layer 150.

The application layer 140 is also called the user layer because users (as well as applications) have control at this level. This layer 140 is also called the untrusted computing layer (UTCL) because processes in this layer are not provided full access to credentials or other security features. Applications 142 and 144 are illustrated in FIG. 1. Examples of such applications include Web browser, e-mail software, etc.

The secured operating system (OS) layer 150 is also called the trusted computing base (TCB). A specific implementation of the TCB may be called the local security authority (LSA). The application and user of the UTCL 140 cannot meddle in the security processes of the TCB 150. However, the processes of the UTCL 140 may request access to credentials from the TCB 150. A security process of the TCB 150 may respond to a request from a UTCL process.

A credential management module 152 is one such security process in the TCB 150. As it name implies, it manages the credentials of the computer 130. More specifically, it manages the credentials of each user of the computer 130.

Although not illustrated in FIG. 1, credential management module 152 may be composed a multiple submodules. Some of these may be application-programming interfaces (APIs) that the applications may call to access credentials. More details about such APIs are provided in the "Exemplary Implementation employing APIs" section below. One or more other submodules may control the actual access of a user's credentials (including reads and writes) and control the encryption and decryption of credential databases, such as databases 154a–c. Herein, this submodule may be called the "credential management submodule."

Encrypted Credential Data Structure

FIG. 1 illustrates multiple encrypted credential databases 154a–c with a graphical representation of a "user" associated with each database. This indicates that each database is associated with a particular user. The credentials for each user is collected and stored together within a database structure (e.g., databases 154a–c) associated with a specific user. That database is encrypted.

Figure 2:
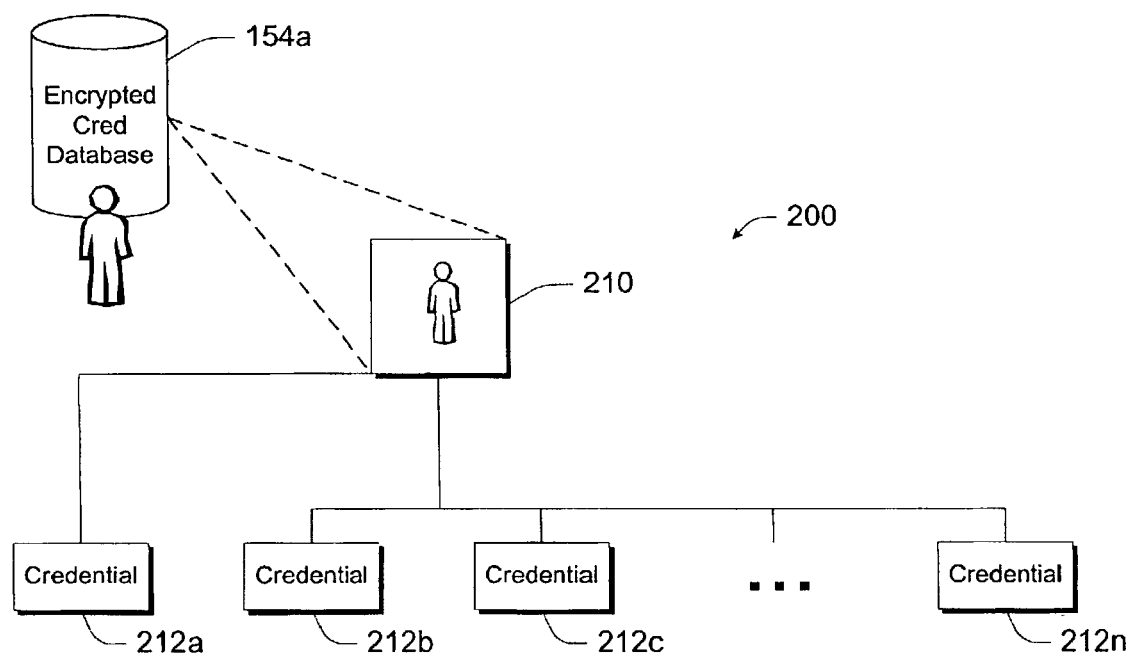
FIG. 2 is a schematic block diagram showing data structure employed by an embodiment of the invention claimed herein.

FIG. 2 shows an example of an encrypted credential database (i.e., data structure) 154a, which is associated with a specific user. The hierarchy of the credential data structure 154a is represented at 200. Block 210 identifies the user. Under the user block 210 are multiple credentials, such as credentials 212a, 212b, 212c, and 212n. These credentials are not individually encrypted. Rather, the entire datastructure (such as 154a) is encrypted.

Credential Retrofit

Unlike conventional credential managers, the exemplary cred-manager provides a mechanism to retrofit legacy systems—that only have provisions for traditional username/password authorization model—to use a non-password authorization model (e.g., X.509 Certificates).

The exemplary cred-manager allows the use of non-password based credentials as if they were username and password pairs in order to avoid extensive modifications of existing applications.

The exemplary cred-manager provides a credential model retrofit for legacy applications that only understand the password model. The manager marshals high-level credentials (such as a certificate) so that the high-level credential appears to be a low-level credential (such as a user/password) to legacy applications. The exemplary cred-manager converts high-level credentials into a form so that they may be understood by the legacy applications.

Marshalling

Marshaling is the mechanism by which a description of a non-password credential can be passed to the TCB using an interface designed to support only password credentials. See the marshalling APIs, described in the "Exemplary Implementation employing APIs" section below, for details of an implementation that performs marshalling.

For illustration purposes, the following describes two different exemplary situations where credentials are marshaled:

1. The exemplary cred-manager creates a reference to a certificate by taking the certificate hash and computing a text string for that hash. The certificate hash is a value that uniquely identifies a certificate.
    This text string is used in two places:
    a. In a credential stored in the credential manager, it is used in the UserName field of the credential as the reference to the certificate.
    b. When the credential is not stored, it is returned in the UserName field as a reference to the certificate. The entire purpose of returning this marshaled form is to support passing the reference to interfaces that only support password credentials.

2. The exemplary cred-manager creates a reference to a credential stored in credential manager. See the "Blind Courier" section below for more info on this. In one implementation, the exemplary cred-manager returns a UserName from dialog box prompting the user for the user name. Specifically, for password credentials, the UserName field returns the UserName in the clear and the Password field returns the password in the clear. For certificate credentials, the UserName field returns the marshaled cert reference and the Password field returns the "PIN" protecting the private key associated with the cert.

Marshaling Example

For this example, assume that one marshals a reference to a certificate and that certificate has a hash of "68151c37ea8a4560 81cefd14 1a3f8f7c 7a7b7b9a". An example of a marshaled form is "@@B3wRFoBWRKqOF97cg894Pao5e7pH"

In this example, the marshaled form always has @@ at the front. Then bytes are converted to characters simply by looking up 6-bit values from a table, such as the table shown in the routine CredpMarshalChar below. The first character after the @@ is always the type of the marshaled string. In this case, it is a certificate so the type is CertCredential (from the CRED_MARSHAL_TYPE enum below). That's a 1. Looking up 1 in the CredpMarshalChar array and you note that it maps to a "B". Hence the string above starts out as "@@B".

The remaining bytes (the cert hash itself) are marshaled via the routine CredpMarshalBytes (included below). It breaks 3 bytes of input into 4 6-bit fields then calls CredpMarshalChar. In this example, the 0×37 is the first 6 bits of the input. The 0×37'th character in the CredpMarshalChar array is "3". Hence, the string above starts out as "@@B3". This is simply repeated until there are no more bytes in the input. As needed, zero bits are logically concatenated to the end of the input string as padding to ensure that a multiple of 6 bits are available to be processed.

The following ("CredpMarshalChar" and CredpMarshalByte") are examples of pseudocode for generating a marshaled credential:

```
CredpMarshalChar(
    IN OUT LPWSTR *Current,
    IN ULONG Byte
    )
/*++
Routine Description:
    This routine marshals 6 bits into a buffer.
Arguments:
    Current - On input, points to a pointer of the current location in the marshaled buffer.
        On output, is modified to point to the next available location in the marshaled buffer.
    Byte - Specifies the 6 bits to marshal
Return Values:
    None.
--*/
{
    UCHAR MappingTable[] = {
        'A', 'B', 'C', 'D', 'E', 'F', 'G', 'H', 'I', 'J', 'K', 'L', 'M',
'N', 'O', 'P',
```

-continued

```
        'Q', 'R', 'S', 'T', 'U', 'V', 'W', 'X', 'Y', 'Z', 'a', 'b', 'c',
'd', 'e', 'f',
        'g', 'h', 'i', 'j', 'k', 'l', 'm', 'n', 'o', 'p', 'q', 'r', 's',
't', 'u', 'v',
        'w', 'x', 'y', 'z', '0', '1', '2', '3', '4', '5', '6', '7', '8',
'9', '#', '_'
    };
    if ( Byte > 0x3F ) {
        *(*Current) = '=';
    } else {
        *(*Current) = MappingTable[Byte];
    }
    (*Current)++;
}
CredpMarhsalBytes(
    IN OUT LPWSTR *Current,
    IN LPBYTE Bytes,
    IN ULONG ByteCount
    )
/*++
Routine Description:
    This routine marshals bytes into a buffer.
Arguments:
    Current - On input, points to a pinter of the current location in the
marshaled buffer.
            On output, is modified to point to the next available location in
the marshaled buffer.
    Bytes - Specifies the buffer to marshal
    ByteCount - Specifies the number of bytes to marshal
Return Values:
    None.
--*/
{
    ULONG i;
    union {
        BYTE ByteValues[3];
        struct {
            ULONG Bits1 :6;
            ULONG Bits2 :6;
            ULONG Bits3 :6;
            ULONG Bits4 :6;
        } BitValues;
    } Bits;
    //
    // Loop through marshaling 3 bytes at a time.
    //
    for ( i=0; i<ByteCount; i+=3 ) {
        ULONG BytesToCopy;
        //
        // Grab up to 3 bytes from the input buffer.
        //
        BytesToCopy = min ( 3, ByteCount-i );
        if ( BytesToCopy != 3 ) {
            RtlZeroMemory( Bits.ByteValues, 3);
        }
        RtlCopyMemory( Bits.ByteValues, &Bytes[i], BytesToCopy );
        //
        // Marshal the first twelve bits
        //
        CredpMarshalChar( Current, Bits.BitValues.Bits1 );
        CredpMarshalChar( Current, Bits.BitValues.Bits2 );
        //
        // Optionally marshal the next bits.
        //
        if ( BytesToCopy > 1 ) {
            CredpMarshalChar( Current, Bits.BitValues.Bits3 );
            if ( BytesToCopy > 2 ) {
                CredpMarshalChar( Current, Bits.BitValues.Bits4 );
            }
        }
    }
}
```

Blind Courier

The exemplary cred-manager provides a mechanism where the application is only a "blind courier" of credentials between the TCB 150 and the domain and/or domain resource. The manager fully insulates the application from "read" access to the credentials. Therefore, the application never knows the actual credential. If a new credential needs to be created, the applications bands this process to the credential management module 152 to handle.

If a legacy application requests a credential for a specified resource/network, the exemplary cred-manager passes it a "marshaled" credential. Thus, the application never sees the true high-level credential. The exemplary cred-manager makes the high-level credential available to the SSPs. The SSPs process the high-level credential as though it were passed directly in by the application program.

A Methodological Implementation of the Exemplary Cred-Manager

Figure 3:
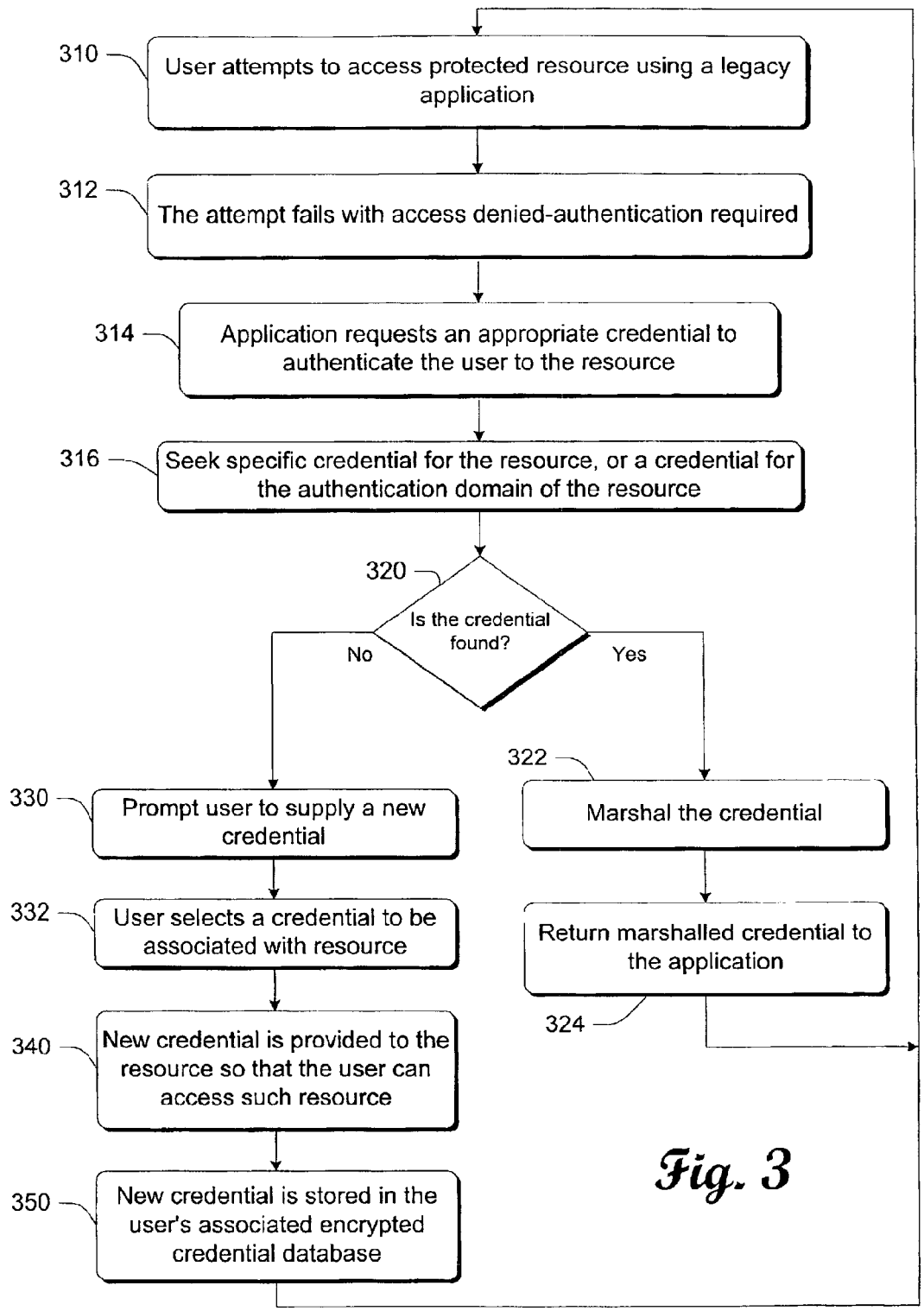
FIG. 3 is a flow diagram showing a methodological implementation of the invention claimed herein.

FIG. 3 shows methodological implementation of the exemplary cred-manager performed within the credential management architecture 100 (or some portion thereof). This methodological implementation may be performed in software, hardware, or a combination thereof. This methodological implementation assumes that the application utilizes the exemplary cred-manager is a legacy application.

At 310 of FIG. 3, a user attempts to access protected resource (such as a secure Web site, a printer, a server, etc.) using an application, such as a Web browser. Such a resource may be part of authentication domain, such as domains 110a–c of FIG. 1. Step 310 is implemented by an application program attempting an authentication. It does that by using the SSP. The SSP will ask the cred manager if there is already a credential for the resource. If so, that credential will be used. If that credential works, process ends (not shown in FIG. 3) and does not proceed to step 312.

At 312 of FIG. 3, the attempt fails with access denied—authentication required. With the exemplary cred-manager, the user never sees this denial. At 314, the application asks the exemplary cred-manager for a user credential to be used to authenticate the user to the resource. More specifically, the application may call a credential-user-interface APIs (such as CredUI APIs) to accomplish this task. Alternatively, the application may seek the appropriate credential before actually attempting access and receiving a denial. These steps (310–314) refers to generic credentials rather than domain credentials.

At 316, the exemplary cred-manager seeks specific credential for the resource, or a credential for the authentication domain of the resource (as defined by the application protocol). More specifically, the CredUI API may ask credential management module for such a credential.

At 320 of FIG. 3, if a credential is found, it is "marshaled". When marshaled, a high-level credential is converted into a low-level credential (such as username and password). At 322, the found credential is returned to the application in the form of the "marshaled" username and password. At 324, the application authenticates the marshaled credential. It may do this by passing the marshaled credential to legacy authentication APIs. The application acts as a "blind courier" because it never sees the true high-level credential.

At 330, if no suitable credential is found, the user is prompted to supply a credential. At 332, the user provides (e.g., by typing it in a dialog box) a credential to be associated with resource. Again, the application acts as a "blind courier" because it never sees the true high-level credential.

At 340, the new credential is provided to the resource so that the user can access such resource. The user is asked if he wants to save the credential. If so, the credential is written into credential manager. This "harvested" credential is then available for use by any other application being run by this user. If the user does not want to save the credential, the credential is not written into credential manager. In both cases, the credential is "blind couriered" back to the application.

In one implementation, a credential—unwritten to the cred manager—is blind couriered by saving it in a submodule of cred manager in a place where it cannot be referenced or used by other applications of this user.

With respect to "saved" credentials, if the resource is a member of an authentication domain, the credential may be used authenticate to the domain and to any resource of that domain. Otherwise, if the resource is not a member of an authentication domain, the credential is specifically associated with the resource and used to access that resource.

At 350, the new credential is stored in the user's associated encrypted credential database. Of course, this step only applies to "saved" credentials.

This process may be repeated and some steps may occur concurrently.

Single Sign-On

Unlike conventional credential managers, the exemplary cred-manager employs a single sign-on mechanism that automatically and transparently provides credentials for accessing the multiple resources within an authorized domain to the multiple resources. The exemplary cred-manager is domain-authentication aware. In other words, an authentication by one resource in a trust network enables automatic (without manual user input) authenticated access to all resources in that trust network.

Traditional methods of providing single sign-on usually require that a distinct credential be used for each unique network, network resource, or network application that requires authentication. This can result in the storage of large numbers of user credentials that must be securely maintained for the user and managed.

However, many resources are in a common authentication domain (i.e., network) and can be identified as such. The exemplary cred-manager identifies resources within a common authentication domain and it automatically provides the appropriate credential (which is often the same credential) as necessary for each resource within a domain that the user has already "signed on." As a result, a single credential can be used to authenticate to a group of resources thereby eliminating the need for multiple identical credentials.

Another Methodological Implementation of the Exemplary Cred-Manager

Figure 4:
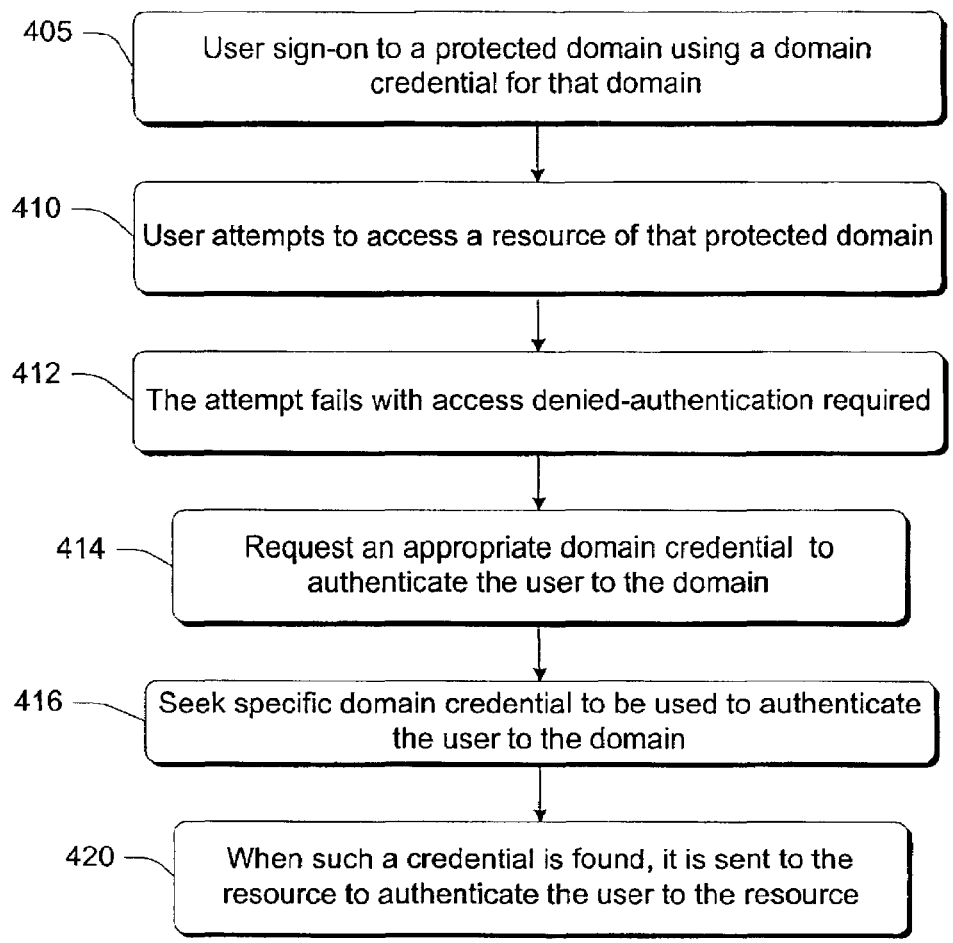
FIG. 4 is a flow diagram showing another methodological implementation of the invention claimed herein.

FIG. 4 shows another methodological implementation of the exemplary cred-manager performed within the credential management architecture 100 (or some portion thereof). This methodological implementation may be performed in software, hardware, or a combination thereof. With this methodological implementation, the applications may be legacy applications or otherwise.

At 405 of FIG. 4, a user sign-on to a protected domain using a domain credential for that domain At 410, the user attempts to access a resource of that protected domain. At 412, the attempt fails with access denied—authentication required. Conventionally, the user must manually provide her domain credential again to access this domain resource. However, with the exemplary cred-manager, the user never sees this denial. Instead, the authentication to this resource is handled automatically by the exemplary cred-manager. At 414 of FIG. 4, the SSP asks the exemplary cred-manager for a domain credential to be used to authenticate the user to the domain. At 416, the exemplary cred-manager seeks the specific domain credential for the domain. At 420, when such a credential is found, it is sent to the resource to authenticate the user to the resource. Now, the user is authenticated to access that resource.

This process may be repeated as necessary (e.g., for each domain being accessed) and some steps may occur concurrently.

Generally, when first connecting to the resource, the server hosting the resource identifies the environment (such as the domain) in which that the resource is. The SSP then asks cred manager for the appropriate credentials and silently uses them. The application is never involved. In an alternative implementation, the exemplary cred-manager never uses two sets of credentials (the default credentials in steps 405–412 and the ones from cred manager the remaining steps). The exemplary cred-manager simply selects the "correct" set of credentials from the beginning.

Trust Extension

Unlike conventional credential managers, the exemplary cred-manager extends this awareness to other trust networks that trust each other. In other words, once a client is authorized on one network, its authorization will automatically be extended to other trusted networks.

For example, assume that the user of computer 130 has successfully signed onto domain 110b of FIG. 1. Assume that there is a trust relationship between domain 110b and 110a. Using the exemplary cred-manager, the user may utilize resources of domain 110a without manually signing-on to domain 110a. The user's authorization in domain 110b is sufficient to access 110a.

Concurrent Authentications on Multiple Domains

The exemplary cred-manager provides a mechanism for concurrent authentications with multiple independent networks (e.g., domains) may be established and maintained.

For example, assume that the user of computer 130 has successfully signed onto domain 110c of FIG. 1. The user may access the domain resources of domain 110c. Conventionally, the user may not sign-on to a separate domain, such as domain 110d. Conventionally, the user may not be signed-on to multiple domains concurrently. However, using the exemplary cred-manager, the user may be concurrently signed-on to multiple domains, such as domain 110c and 110d.

Additional Implementation Details

Applications interact with the credential management system through credential-user-interface APIs (such as CredUI APIs). The model for identifying what credentials are needed from a user follows a "harvesting model." When a protected resource is accessed, that access can fail until the user is able to supply a valid credential that can be used to successfully authenticate the user.

When a user attempts to access resources that require authentication, the user is prompted to supply credentials in order to access that resource. Each different application that does this has a different mechanism to prompt the user for a credential and save it for the user.

This credential is supplied through the CredUI components are stored the encrypted credential databases, such as databases 154a–c of FIG. 1. When the system software requires authentication, a security support provider (SSP) is used to authenticate the user employing an application specific protocol. The credential for the user is accessible to the SSP because the SSP is also part of the TCB. Since the credential is also associated with the authentication domain of the resource and not just the resource, a single credential can be used to authenticate to multiple resources. An example authentication domain can be a Kerberos realm or a Windows® NT® domain.

A legacy application uses the CredUI API to return what appears to be a username and password. Instead, what is returned as a username and password is actually a "handle" that contains a marshaled version of the specific high-level user credential. This marshaled credential appears to the application and intervening APIs as a username and password.

Credentials may be persisted in a local database on the computer and/or distributed database. Thus, encrypted credential databases 154*a–c* may be located on the local computer 130 or on a network.

An application may prompt for a password before trying to access a resource or after trying to access the resource and getting an authentication or access failure.

After an authentication attempt, an application may get a list of all the potential target names for the resource. Some or all of the following names for the target may be returned: the Netbios server name of the machine, the DNS server name of the machine, the Netbios domain name of the domain the machine belongs to, the DNS domain name of the domain the machine belongs to, the DNS tree name of the tree the machine belongs to, and the name of the package that collected the information. Any piece of this information may be missing if the information does not apply to the target machine. For instance, a machine that is a member of a workgroup does not have a Netbios domain name.

An application uses this information to determine the stored credentials that match the target information. The application handles the case where there is no credential set for the logon session or there are no matching credentials. If there are no matching credentials, the default credentials for the logon session are implied.

An application also uses this information to determine the target name of the credential to be saved in cred manager.

Exemplary Scenarios

Scenario 1—Resources in an Untrusting Domain

A user logged on to a computer with domain accounts (such as user@company.com). The user attempts to access a file share in an untrusting forest (such as "xyz/svr.abc-.com"). The user has an account (e.g., user@company.com) in the untrusting forest that must be used to access this file share. When the user first attempts to connect to the file share (e.g., using "net use\\svr.abc.com\stuff"), the user's default domain credentials are tried first. These do not work; however, the server did identify the authentication domain that it is in. Therefore, the user is prompted for credentials for domain abc.com. The credentials are in the form of a username and password. In this case, the user specified "usera@company.com" for the username and types the password for this account.

The application attempts to authenticate the user to the "abc.com" domain using the supplied credentials. The target name of the stored credential is controlled by the target information that's available. Not based on the authentication attempt. For example, if the target information contains only the NetBIOS server name, then the credentials stored will be for that server only. If the target information contains only the DNS server name and the DNS domain name, then the credential stored will be for all servers whose name end in "DNS domain name". Whenever a user attempts to access the resource again, the appropriate credentials will be used to authenticate the user.

Scenario 2—Accessing a Web Site with a Password

A user attempts to access a Web site. This web site requires a username and password before access is allowed (it can be HTTP basic authorization or a forms-based logon). When the Web browser detects that this is a logon request, it will request a user credential for the specified Web resource. If a realm ("realm" is an optional value specified in the WWW—Authenticate header) is specified by the Web site, a credential is requested for that particular realm. If no realm specific credential is found, the user is switched to the secure prompt. The user will provide the username and password to access the realm. If the user checks the "Save Credential" box, then this credential will be used whenever a credential is needed for this realm. If the realm isn't specified, then a specific credential for this URL is saved.

Scenario 3—Accessing a Web Site with a User Certificate

When a Web site requests a user certificate for access, the Web browser may request a certificate for the Web site from the exemplary cred-manager. If the exemplary cred-manager has no saved credentials for this site, it will prompt to have the user select a certificate. This certificate choice is associated to the resource. Any choice that the user makes will be associated with the resource and used the next time.

Exemplary Computing System and Environment

FIG. 5 illustrates an example of a suitable computing environment 900 within which an exemplary cred-manager, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary cred-manager may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary cred-manager may be described in the general context of computer-executable instructions, such as program modules, being executed by a computer. Generally, program modules include routines, programs, objects, components, data structures, etc. that perform particular tasks or implement particular abstract data types. The exemplary cred-manager may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 5 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932.

Each of such operating system 926, one or more application programs 928, other program modules 930, and program data 932 (or some combination thereof) may include an embodiment of a credential management architecture, trusted computing base (TCB), a credential management module, a credential database, a marshaller, a request obtainer, a credential retriever, a credential returner, and an API.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary cred-manager may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 5 illustrates an example of a suitable operating environment 900 in which an exemplary cred-manager may be implemented. Specifically, the exemplary cred-manager(s) described herein may be implemented (wholly or in part) by any program modules 928–930 and/or operating system 926 in FIG. 5 or a portion thereof.

The operating environment is only an example of a suitable operating environment and is not intended to suggest any limitation as to the scope or use of functionality of the exemplary cred-manager(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary cred-manager may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Exemplary Implementation Employing APIs

The following describes application-programming interfaces (APIs) that may be used for an implementation of the exemplary cred-manager. The APIs may be part of the credential management module 152 of FIG. 1.

Credential Management User Interface (CredUI)

The CredUI provides a consistent user experience for prompting a user for application user credentials. It helps minimize prompting the user for credentials once they have provided a credential for a resource. Typically, the user specifies a credential once (username/password) and it is used without prompting the user again.

In all cases where a user is prompted for credentials, the user will not be prompted again for the duration of the logon session. Any credentials, which have been saved under a "don't ask me again" policy, will be persistent across logon sessions.

APIs and Associated Structures

CredUI Info

```
CREDUI _INFO Struct
typedef struct
{
DWORD dwVersion;
HWND hWnd;
PCTSTR           pszMessageText;
PCTSTR           pszCaptionText;
HBITMAP          hbmBitmap;
} CREDMGR_UI_INFO;
```

This structure is filled out by an application when calling CredMgr UI APIs.

For this structure:

hWnd specifies the parent window of any UI dlg that results from the call. The dlg will be app modal. If hWnd is NULL, any UI will have the desktop as its parent.

pszMessageText is any application specific message that is placed in the UI. An application may use this to inform the user of the context in which the credentials would be used. If NULL, the system will supply generic text.

pszCaptionText is any application specific caption that is given to the dialog. If NULL, the system will supply a generic caption.

hbmBitmap is a handle to an application specific bitmap to display in the dialog. This is used for branding purposes. If NULL, the system will supply a generic bitmap.

CredUIPromptForCredentials( )

```
CredIUPromptForCredentials()
DWORD*
WINAPI
CredUIPromptForCredentials{
    PCREDUI_INFO * pUIInfo,
    PCTSTR pszTargetName,
    PCtxtHandle phContext,
    DWORD dwAuthFlags,
    PCTSTR pszUserName,
    ULONG ulUserNameMaxChars,
    PCTSTR pszPassword,
    ULONG ulPasswordMaxChars,
    PBOOL pfSave,
    *DWORD dwFlags
);
```

This API is called when an application needs the user to input credentials, either domain or generic. The credentials entered by the user may be returned to the application.

Parameters:

pUIInfo carries information about the calling application as defined under the CREDUI_INFO struct section above. If this parameter is NULL, the system will display any resulting UI with the Desktop as its parent hwnd, using generic information text.

pszTargetName is the target the application was trying to reach. If phContext is NULL, this value will be used to query CredMgr for extended target information. CredMgr will have temporarily stored the extended target info in a CREDENTIAL_TARGET_INFORMATION structure associated with the TargetName that came from the SSP (which is the same target name that the app supplies here).

phContext is the context returned from a call to InitializeSecurityContext( ). This is used by the CredMgr UI both to determine information about any credentials found by the ISC call, and to return information about the user's selections in the UI. If CredMgrGetCredentials( ) returns SEC_E_OK the application should pass this context back into another call to ISC. If this value is NULL, CredMgr UI will use the szTargetName to determine extended target info.

dwAuthFlags is used to specify why the credential dialog is needed. A caller may pass this optional Windows error parameter, returned by another authentication call, to allow CredUI to special-case certain errors.

pszUserName is the user name for the creds. The CredMgr UI will write the user-supplied name to this buffer, copying a maximum of ulUserNameMaxChars characters. If the string passed by the application is non-zero length, the UserName field of the dlg will be prefilled with the string. This parameter may be NULL, if the application does not require the credentials to be returned.

ulUserNameMaxChars is the maximum number of characters that may be copied to pszUserName.

pszPassword is the password for the creds. The CredMgr UI will write the user-supplied password to this buffer, copying a maximum of ulPasswordMaxChars characters. If the string passed by the application is non-zero length, the password field of the dlg will be prefilled with the string. This parameter may be NULL, if the application does not require the credentials to be returned.

ulPasswordMaxChars is the maximum number of characters that may be copied to szPassword.

pfSave is an out parameter used if the CREDUI_FLAGS_SHOW_SAVE_CHECK_BOX is set. It will return the state of the save checkbox when the user hits Ok to the dialog. This is used if applications which to save the credentials under their own storage mechanism.

dwFlags is used by the app to specify behavior of the call. Valid values and their meaning are:

CREDUI_FLAGS_INCORRECT_PASSWORD—Notify the user of insufficient credentials by displaying the "Logon unsuccessful" balloon tip.

CREDUI_FLAGS_EXCLUDE_CERTIFICATES—Regardless of the target info, do not display certificates or smart cards in the combo box.

CREDUI_FLAGS_DO_NOT_PERSIST—Do not store credentials in credmgr or display persistence check boxes. You may pass CREDUI_FLAGS_SHOW_SAVE_CHECK_BOX to display the save check box only, and the result is returned in the save out parameter.

CREDUI_FLAGS_REQUEST_ADMINISTRATOR—Populate the combo box with local Administrators only. On Personal SKU, this will filters out the well-known Administrator account.

CREDUI_FLAGS_REQUIRE_CERTIFICATE—Populate the combo box with certificates and smart cards only. Do not allow a user name to be entered.

CREDUI_FLAGS_SHOW_SAVE_CHECK_BOX—Shows the "Save" check box and returns TRUE in the pfSave out parameter if the check box is checked, otherwise FALSE. CREDUI_FLAGS_DO_NOT_PERSIST must be specified to use this flag.

CREDUI_FLAGS_ALWAYS_SHOW_UI—Always show the CredUI. It is implicitly enabled if the CREDUI_FLAGS_DO_NOT_PERSIST flag is specified. If this is not enaled, if the cred mgr finds a saved credential for the user and it can be used without verification, then no UI will be popped.

CREDUI_FLAGS_GENERIC_CREDENTIALS—The credentials entered by the user should be considered generic credentials. If not present, the credentials will be considered domain credentials, and saved to cred mgr as such.

Return Values:

SEC_E_OK User it OK button, pszUserName and pszPassword will contain the values entered in the appropriate edit box fields.

SEC_E_NO_CREDENTIALS User hit Cancel button, pszUserName and pszPassword have not changed.

Marshaling APIs:

The CERT_CREDENTIAL_INFO structure describes a reference to a certificate.

```
#define CERT_HASH_LENGTH 20
typedef struct _CERT_CREDENTIAL_INFO {
    ULONG cbSize;
    UCHAR rgbHashOfCert [CERT_HASH_LENGTH];
} CERT_CREDENTIAL_INFO, *PCERT_CREDENTIAL_INFO;
```

CERT_CREDENTIAL_INFO Field Definitions:

cbSize—Specifies the total size of the structure. This field should be set to size of (CERT_CREDENTIAL_INFO). When reading the structure, it may be a larger value in the future indicating a newer version of the structure.

RgbHashOfCert—Specifies the SHA-1 hash of the certificate being referenced.

The CRED_MARSHAL_TYPE enumeration describes the different types of credential that can be marshaled by CredMarshalCredential or unmarshaled by CredUnmarshalCredential.

```
typedef enum _CRED_MARSHAL_TYPE {
    CertCredential = 1
} CRED_MARSHAL_TYPE, *PCRED_MARSHAL_TYPE;
```

CRED_MARSHAL_TYPE Values:

CertCredential—Specifies that the credential is a certificate reference described by a CERT_CREDENTIAL_INFO structure.

The CredMarshalCredential API marshals a credential into a text string.

Historically, many API (for instance, NetUseAdd) take a domain name, username and password as credentials. Such API cannot accept credentials that are certificates. The CredMarshalCredential API converts such credentials into a form that can be passed into these API.

The marshaled credential should be passed as the user name string to any API that is currently passed credentials. The domain name (if applicable) passed to that API should be passed as NULL or empty. For certificate credentials, the PIN of the certificate should be passed to that API as the password.

The caller should not modify or print the marshaled credential. The returned value can be freely converted between the Unicode, ANSI, and OEM character sets. The string is case sensitive.

The CredMarshalCredential API is available in ANSI and UNICODE versions.

```
BOOL
CredMarshalCredential (
    IN CRED_MARSHAL_TYPE CredType,
    IN PVOID Credential,
    OUT LPTSTR *MarshaledCredential
)
```

Parameters:

CredType—Specifies the type of credential to marshal.

Credential—Specifies the credential to marshal.

If CredType is CertCredential, then Credential points to a CERT_CREDENTIAL_INFO structure.

MarshaledCredential—Returns a text string containing the marshaled credential. The caller should free the returned buffer using CredFree.

On success, TRUE is returned. On failure, FALSE is returned.

GetLastError( ) may be called to get a more specific status code. The following status codes may be returned:

Error Codes:

ERROR_INVALID_PARAMETER—CredType is invalid

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for accommodating a legacy application, the legacy application resident on a legacy system having provisions for a low-level credential authorization model which employs username-and-password based authorization, the method comprising:

obtaining a request from a high-level credential authorization model for a high-level credential to be provided by the legacy application, wherein the high-level credential authorization model does not employ username-and-password based authorization;

retrieving the requested high level credential from a database of credentials; and marshaling the requested high-level credential, the marshaling is characterized by converting a description of the high-level credential into a format recognizable as a low-level credential by the legacy application employing a low-level credential authorization model, wherein the marshaling is a mechanism by which a description of the high-level credential is passed through a secured operating system layer using an interface designed to output low-level credentials.

2. A method as recited in claim 1, wherein a high-level credential is a credential selected from a group composed of X.509 Certificates and bio-metrics.

3. A method as recited in claim 1, wherein the marshaled credentials appear to be a conventional username and password pair to the legacy application.

4. A method as recited in claim 1, wherein marshaling comprises:

obtaining the requested high-level credential;

converting the requested high-level credential to generate a low-level credential that represents the requested high-level credential while appearing to be a conventional username and password pair to the legacy application.

5. A method as recited in claim 1, wherein the legacy application never has access to the high-level credential.

6. A computer-readable medium having computer-executable instructions that, when executed by a computer, perform a method as recited in claim 1.

7. A method as recited in claim 1, wherein the marshaling is performed by creating a reference to a certificate by taking a certificate hash and computing a text string for the certificate hash.

8. A method as recited in claim 1, wherein the marshaling is performed by creating a reference to credential stored in credential manager.

9. In a computing environment where legacy processes have a provision for low-level credentials but have no provision for high-level credentials, wherein a provision for low-level credentials employs username-and-password based authorization while a provision for high-level credentials does not employ username-and-password based authorization, a method for accommodating such processes comprising:

obtaining a request for a credential from a legacy process, wherein the requested credential is a high-level credential, which is not username-and-password based;

retrieving the requested credential from a database;

converting the requested high-level credential into a format approximating a low-level credential and representative of the requested high-level credential; and passing a description of the high-level credential through a secured operating system layer using an interface designed to output low-level credentials.

10. A method as recited in claim 9, wherein a high-level credential is a credential selected from a group composed of X.509 Certificates and bio-metrics.

11. A method as recited in claim 9, wherein the converted credentials appear to be a conventional username and password pair to the legacy process.

12. A method as recited in claim 9, wherein the legacy process never has access to the high-level credential.

13. A computer-readable medium having computer-executable instructions that, when executed by a computer, perform a method as recited in claim 9.

14. A method for authenticating a user to a network, the method comprising:
- using an interface designed to output low-level credentials;
- obtaining a request for a high-level credential to authenticate the user to access a resource within the network, wherein the resource requires an appropriate high-level credential before the user may access the resource;
- locating the appropriate high-level credential;
- passing a description of the high-level credential, through a secured operating system layer using said interface so high-level credential is formatted as a low-level credentials,
- returning the appropriate high-level credential to the resource within the network, so that the resource allows the user to access such resource;
- wherein the obtaining, locating, and returning, and passing are performed without user interaction so that the user need not be aware that such steps are being performed.

15. A method as recited in claim 14 further comprising repeating the obtaining, locating, and returning for a different network that is authenticated using a different credential.

16. A computer-readable medium having computer-executable instructions that, when executed by a computer, perform a method as recited in claim 14.

17. A credential management architecture, comprising:
- a trusted computing base (TCB) that has full access to persisted credentials, the TCB being configured to interact with an untrusted computing layer (UTCL) that accesses the persisted credentials via the TCB,
- the TCB comprises:
  - a credential management module configured to receive requests from the UTCL for a high-level credential for a resource, the high-level credential being associated with a user and not being username-and-password based authorization;
  - a credential database associated with the user, wherein credentials are persisted within the database;
  - the credential management module being configured to retrieve credentials from the database; and
  - an interface that performs marshaling, wherein marshaling is characterized by converting a description of the high-level credential into a format recognizable as a low-level credential by the legacy application.

18. An architecture as recited in claim 17, wherein the marshaled credentials appear to be a conventional username and password pair to the UTCL.

19. A computer-readable medium having computer-executable instructions that, when executed by a computer, employ an architecture as recited in claim 17.

20. An operating system embodied on a computer-readable medium having computer-executable instructions that, when executed by a computer, employ an architecture as recited in claim 17.

21. An apparatus comprising:
- a processor;
- a marshaller executable on the processor to:
  - obtain a high-level credential, wherein a high-level credential is employed in an authorization model which is not username-and-password based authorization;
  - convert the high-level credential to generate a representation of the high-level credential that is formatted as a low-level credential so that it appears to be a conventional username and password pair; and
  - pass a description of the high-level credential through a secured operating system layer using an interface designed to output low-level credentials.

22. An accommodation system comprising:
- a request obtainer configured to obtain a request for a high-level credential from a low-level-credential-application, wherein low-level credentials utilizes username-and-password based authorization while high-level credentials do not employ username-and-password based authorization;
- a credential retriever configured to retrieve the requested credential from a database of credentials;
- a marshaler configured to marshal the requested credential and return the marshaled credential to the low-level-credential-application, wherein marshaling performed by the marshaler is characterized by converting a description of the high-level credential into a format recognizable as a low-level credential by the low-level-credential-application employing a low-level credential authorization model and passing a description of the high-level credential through a secured operating system layer using an interface designed to output low-level credentials.

23. A system as recited in claim 22, wherein a high-level credential is a credential selected from a group composed of X.509 Certificates and bio-metrics.

24. A system as recited in claim 22, wherein the marshaled credentials appear to be a conventional username and password pair to the legacy application.

25. A system as recited in claim 22, wherein the low-level-credential-application never has access to the high-level credential.

26. A system for authenticating a user to a network, the system comprising:
- a request obtainer configured to obtain a request for a high-level credential to authenticate the user to access a resource within the network, wherein the resource requires an appropriate credential before the user may access the resource, wherein a high-level credential do not utilize username-and-password based for high-level credential authorization;
- a credential retriever configured to retrieve the appropriate high-level credential from a database of credentials;
- a credential marshaler configured to generate a representation of the high-level credential formatted as a low-level credential so that it appears to be a conventional username and password pair to a low-level-credential-application, wherein a low-level credential utilizes username-and-password based authorization, and pass a description of the high-level credential through a secured operating system layer using an interface designed to output low-level credentials; and
- a credential returner configured to return the marshaled high-level credential to the resource within the network, so that the resource allows the user to access such resource;
- wherein the obtainer, retriever, marshaler, and returner are further configured to operate without user interaction.

27. An operating system comprising a system as recited in claim 26.

28. A network environment comprising a system as recited in claim 26.

29. An application programming interface (API) method comprising:
- receiving a CredUI-promptfor-credentials call having a set of parameters comprising a TargetName, Context, AuthFlags, and Flags;

retrieving the parameters from the call to determine a specified resource;

obtaining a high-level credential;

associating the high-level credential with the specified resource;

persisting the high-level credential into a database while maintaining the credential's association with the specified resource; and passing a description of a high-level credential, in place of the low-level credential, through a secured operating system layer using an interface designed to output low-level credentials.

30. A method as recited in claim 29, wherein the set of parameters further comprises an indicator of a data structure containing customized information to display in conjunction with a user interface.

31. An application programming interface (API) method comprising:

receiving a CredUI-promptfor-credentials call having a set of parameters comprising a TargetName, UserName, Password, and Flags;

retrieving the parameters from the call to determine a requesting application;

obtaining a request from the application for a high-level credential; and passing a description of a high-level credential, in a format representing a low-level credential, through a secured operating system layer using an interface designed to output low-level credentials.

32. A method as recited in claim 31, wherein the set of parameters further comprises an indicator of a data structure containing customized information to display in conjunction with a user interface.

* * * * *